United States Patent
Jiang et al.

(10) Patent No.: US 11,402,011 B2
(45) Date of Patent: Aug. 2, 2022

(54) TRANSMISSION MECHANISM WITH MONITORING FUNCTION

(71) Applicant: HIWIN TECHNOLOGIES CORP., Taichung (TW)

(72) Inventors: Zong-Sian Jiang, Taichung (TW); Ming-Che Kuo, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 439 days.

(21) Appl. No.: 16/741,706

(22) Filed: Jan. 13, 2020

(65) Prior Publication Data

US 2021/0215244 A1 Jul. 15, 2021

(51) Int. Cl.
*F16H 57/04* (2010.01)
*F16H 57/01* (2012.01)
*F16H 25/22* (2006.01)

(52) U.S. Cl.
CPC ..... *F16H 57/0405* (2013.01); *F16H 25/2204* (2013.01); *F16H 57/01* (2013.01); *F16H 57/0497* (2013.01)

(58) Field of Classification Search
CPC .... G01M 13/02; F16H 25/20; F16H 25/2204; F16H 57/01; F16H 27/0497; F16H 57/0405
See application file for complete search history.

(56) References Cited

U.S. PATENT DOCUMENTS

| | | | | |
|---|---|---|---|---|
| 9,194,477 | B2* | 11/2015 | Lee | F16H 25/2214 |
| 10,767,741 | B1* | 9/2020 | Liu | F16H 25/2015 |
| 2007/0251329 | A1* | 11/2007 | Balasu | F16H 57/01 73/810 |
| 2008/0257080 | A1* | 10/2008 | Singh | F16H 25/20 74/89.23 |
| 2009/0071278 | A1* | 3/2009 | Chiu | F16H 25/2204 74/424.82 |
| 2015/0147007 | A1* | 5/2015 | Huag | F16H 25/2214 384/8 |

FOREIGN PATENT DOCUMENTS

| CN | 101354077 A | 1/2009 |
|---|---|---|
| CN | 102401225 A | 4/2012 |

(Continued)

*Primary Examiner* — Jake Cook
*Assistant Examiner* — Gregory Robert Weber
(74) *Attorney, Agent, or Firm* — Winston Hsu

(57) ABSTRACT

A transmission mechanism with monitoring function includes a shaft, a moving part, a circulating device, a plurality of rollers and a monitoring module. The shaft has a roller groove. The moving part is movably disposed on the shaft. The moving part has a roller slot corresponding to the roller groove. The roller slot has an effective thread section and an ineffective thread section. The effective thread section and the roller groove together form a load path. The circulating device is disposed on the moving part. The circulating device has a return channel communicated with the load path. The return channel and the load path together form a circulating path. The plurality of rollers are disposed in the circulating path. The monitoring module includes a gathering body and a sensor. The sensor is for detecting a metal content of the lubricant in the gathering channel.

5 Claims, 13 Drawing Sheets

(56) References Cited

FOREIGN PATENT DOCUMENTS

| | | |
|---|---|---|
| CN | 104806718 A | 7/2015 |
| EP | 2 679 866 A1 | 1/2014 |
| JP | 2003-220638 | 8/2003 |
| JP | 2008-180380 | 8/2008 |
| JP | 2008-208974 | 9/2008 |
| JP | 2014114944 A * | 6/2014 |

* cited by examiner

TRANSMISSION MECHANISM WITH MONITORING FUNCTION

BACKGROUND OF THE INVENTION

1. Field of the Invention

The present disclosure relates to a transmission mechanism, and more particularly, to a transmission mechanism with monitoring function.

2. Description of the Prior Art

In general, a linear transmission device such as a ball screw is composed of a moving body such as a screw cap or a nut, a shaft such as a screw shaft and a rolling element such as a ball. Japanese Patent with U.S. Pat. No. 5,076,887 discloses a ball screw, which supplies lubricant from lubricant supply holes (20a, 20b) via a lubricant supply unit (23), an iron powder concentration meter (27) is applied to measure an iron powder concentration of the lubricant discharged from a lubricant discharge hole (21), and a second iron powder concentration meter (32) is applied to measure an iron powder concentration of the lubricant after the lubricant passes through a filtering device (29). When a difference between the iron powder concentration of the lubricant after passing through the filtering device (29) and the iron powder concentration of the lubricant before passing through the filtering device (29) exceeds a default threshold value, a control device of the filtering device (29) outputs a replacement signal. However, the technology cannot monitor the iron powder concentration in real time. The user has to extract the lubricant from the ball screw to analyze the concentration. In addition, when the lubricant is completely extracted, the ball screw needs to be turned off. Accordingly, the operation of the machine and the production process are affected.

Taiwan patent with U.S. Pat. No. 1,499,729 discloses a linear transmission device with wear detection function, which includes a shaft (1), a moving body (2), a plurality of rolling elements (5), a wear detector (4) and an alarm module. The alarm module has two connecting ends, which are electrically connected to the moving body (2) and a magnetic body (42) of the wear detector (4), respectively. One end of the magnetic body (42) is disposed opposite to an outer surface of the shaft (1). The end is defined as an adsorption end (421) for adsorbing worn particles between the shaft (1), the moving body (2), and the plurality of rolling elements (5). Whether the wear detector (4) is turned on or not is controlled by the amount of the worn particles (7). When the amount of the worn particles (7) is sufficient to contact the magnetic body (42) and the moving body (2), the wear detector (4) is turned on and is triggered to send an alarm signal. However, the analysis method is not objective. Furthermore, when the size or volume of the worn particles (7) is too large, or the worn particles (7) contact the moving body (2) and the magnetic body (42) due to the wrong absorption position, the wear detector (4) may be turned on, so as to generate a false alarm. Furthermore, since the absorbed worn particles (7) cannot be removed from the adsorption end (421) of the magnetic body (42) in the process of operation, this kind of structure cannot be reused.

Taiwan patent with U.S. Pat. No. 1,320,080 discloses a structure for reducing wear of a ball screw. The ball screw includes a screw shaft (10) with thread groove (11) and a nut (20) with internal thread (21). The thread groove (11) of the screw shaft (10) and the internal thread (21) of the nut (20) are engaged with each other via balls (30). The bottoms of the internal thread (21) of the nut (20) and the thread groove (11) of the screw shaft (10) are arranged with oil channels (22) for a lubricant to flow therethrough. The outer edge of the nut (20) is disposed with a magnet for absorbing the residual worn particles (50) of the lubricant so as to attach the worn particles (50) to the oil channels (22). By attaching the worn particles (50) to the oil channels (22) with the method of the magnetic attraction, wear of the ball screw caused by the worn particles (50) can be reduced, and the accuracy of the ball screw can be maintained. However, the arrangement can only absorb the worn particles in a passive way, and has no active monitoring and warning function.

SUMMARY OF THE INVENTION

The present disclosure aims at providing a transmission mechanism with monitoring function to timely detect a metal content in lubricant in order to monitor wear of relative components.

According to one embodiment, a transmission mechanism with monitoring function includes a shaft, a moving part, a circulating device, a plurality of rollers and a monitoring module. The shaft has a roller groove. The moving part is movably disposed on the shaft. The moving part has a roller slot corresponding to the roller groove. The roller slot has an effective thread section and an ineffective thread section. The effective thread section of the roller slot and the roller groove together form a load path. The circulating device is disposed on the moving part. The circulating device has a return channel communicated with the load path. The return channel and the load path together form a circulating path. The plurality of rollers are disposed in the circulating path. The roller groove and the roller slot are covered with a lubricant to lubricate the plurality of rollers. The monitoring module includes a gathering body and a sensor. The gathering body is disposed in the ineffective thread section of the roller slot. The gathering body has a gathering channel communicated with the roller groove. The sensor is disposed on the gathering body, and a sensing end of the sensor is disposed in the gathering channel. The sensor is for detecting a metal content of the lubricant in the gathering channel.

According to another embodiment of the present disclosure, a transmission mechanism with monitoring function includes a shaft, a moving part, a circulating device, a plurality of rollers and a monitoring module. The shaft has a roller groove. The moving part is movably disposed on the shaft. The moving part has a roller slot corresponding to the roller groove. The roller slot has an effective thread section and an ineffective thread section. The effective thread section of the roller slot and the roller groove together form a load path. The moving part has a peripheral wall, a first end portion and a second end portion opposite to the first end portion. The peripheral wall is connected between the first end portion and the second end portion. The circulating device is disposed on the moving part. The circulating device has a return channel communicated with the load path. The return channel and the load path together form a circulating path. The plurality of rollers are disposed in the circulating path. The roller groove and the roller slot are covered with a lubricant to lubricate the plurality of rollers. The monitoring module includes a shell, a gathering body and a sensor. The shell is disposed on the first end portion or the second end portion. The gathering body is disposed in the shell. The gathering body has a gathering channel communicated with the roller groove. The sensor is disposed on the gathering body, and a sensing end of the sensor is disposed in the gathering channel. The sensor is for detecting a metal content of the lubricant in the gathering channel.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the disclosure may be practiced. In this regard, directional terminology, such as top, bottom, left, right, front or back, is used with reference to the orientation of the Figure (s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items. Unless limited otherwise, the terms "connected", and "installed" and variations thereof herein are used broadly and encompass direct and indirect connections and installations. Accordingly, the drawings and descriptions will be regarded as illustrative in nature and not as restrictive.

Figure 1:
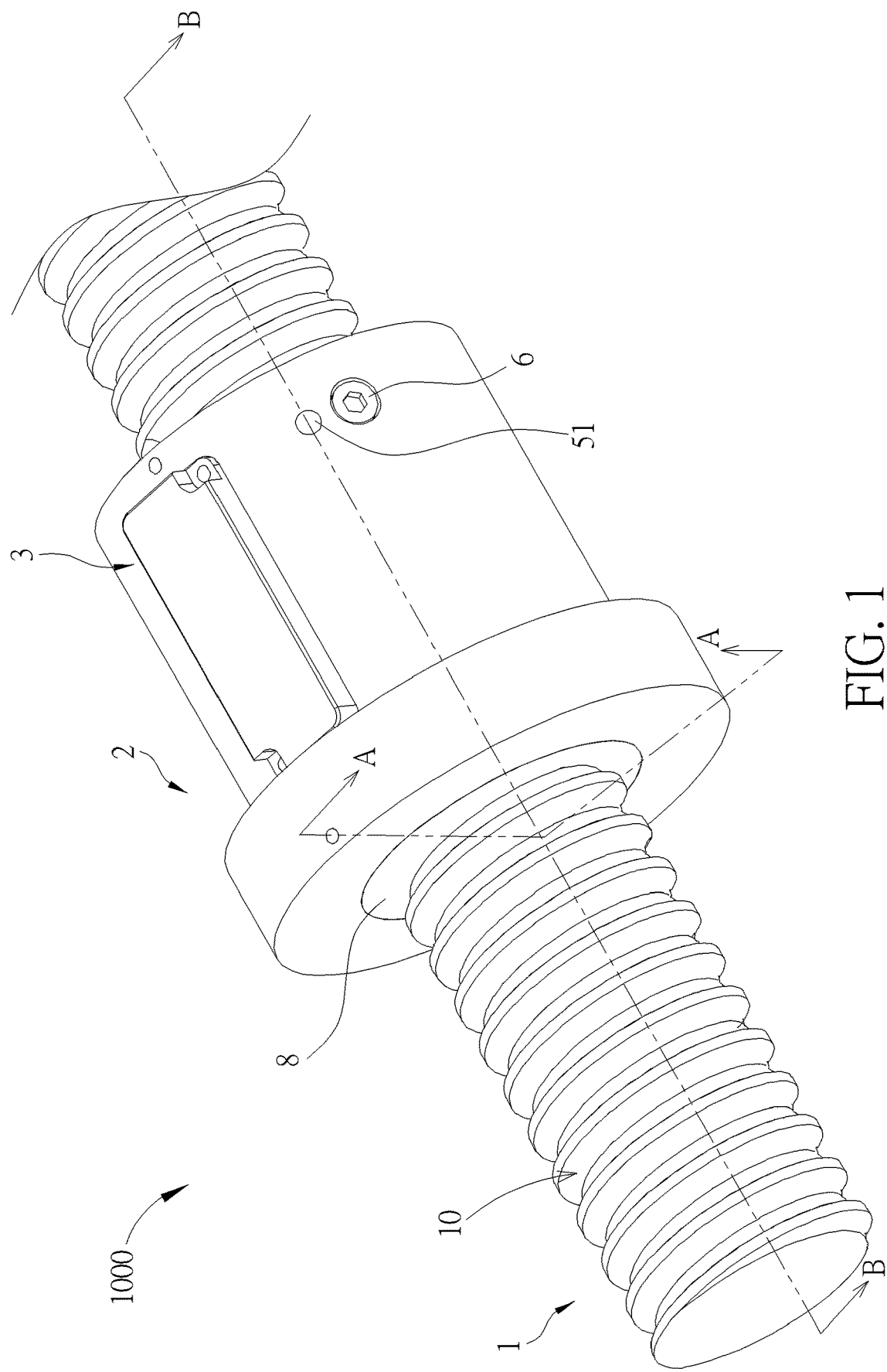
FIG. 1 is a schematic diagram showing a transmission mechanism according to a first embodiment of the present disclosure.
Figure 2:
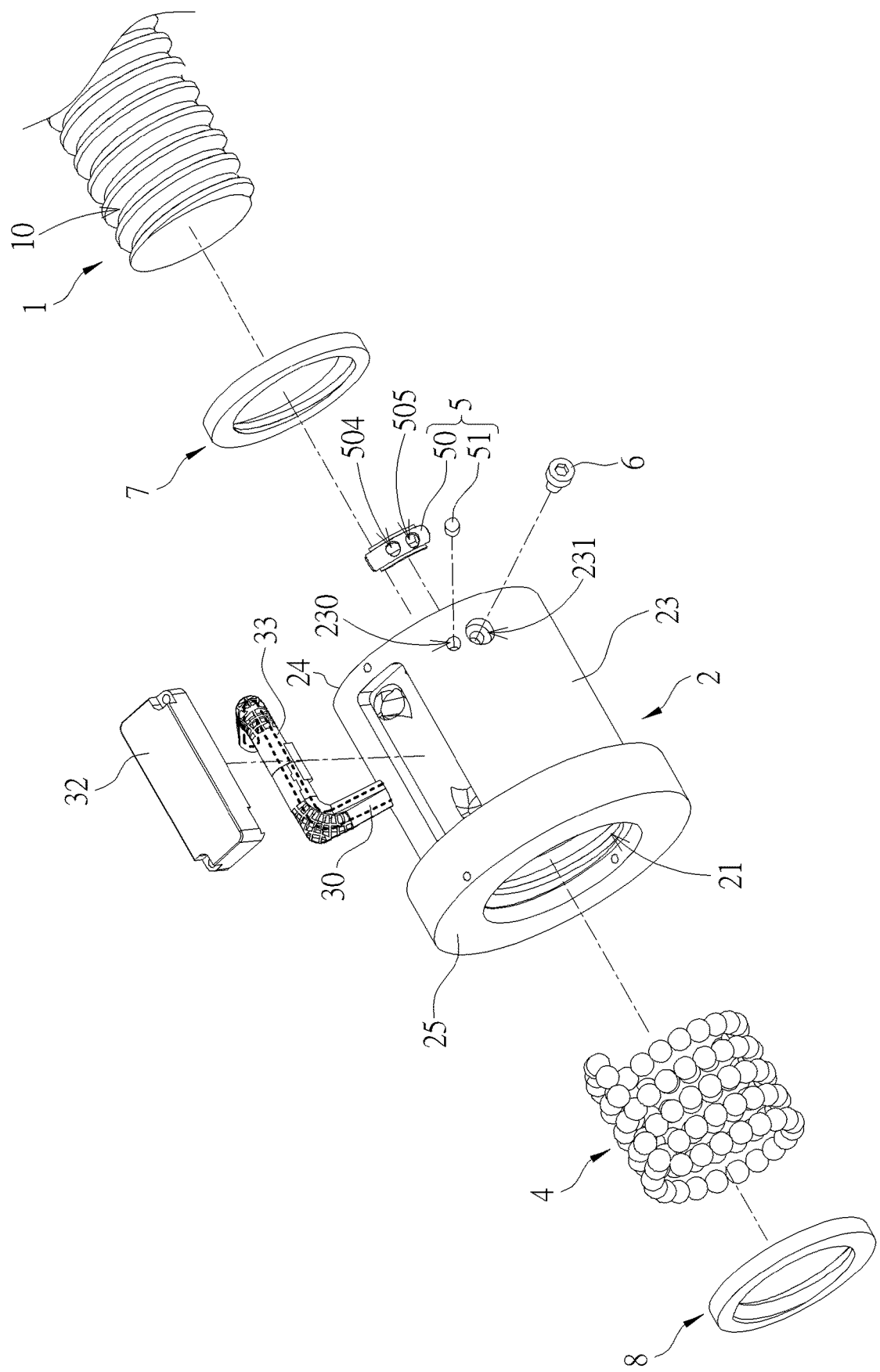
FIG. 2 is an exploded diagram showing the transmission mechanism according to the first embodiment of the present disclosure.
Figure 3:
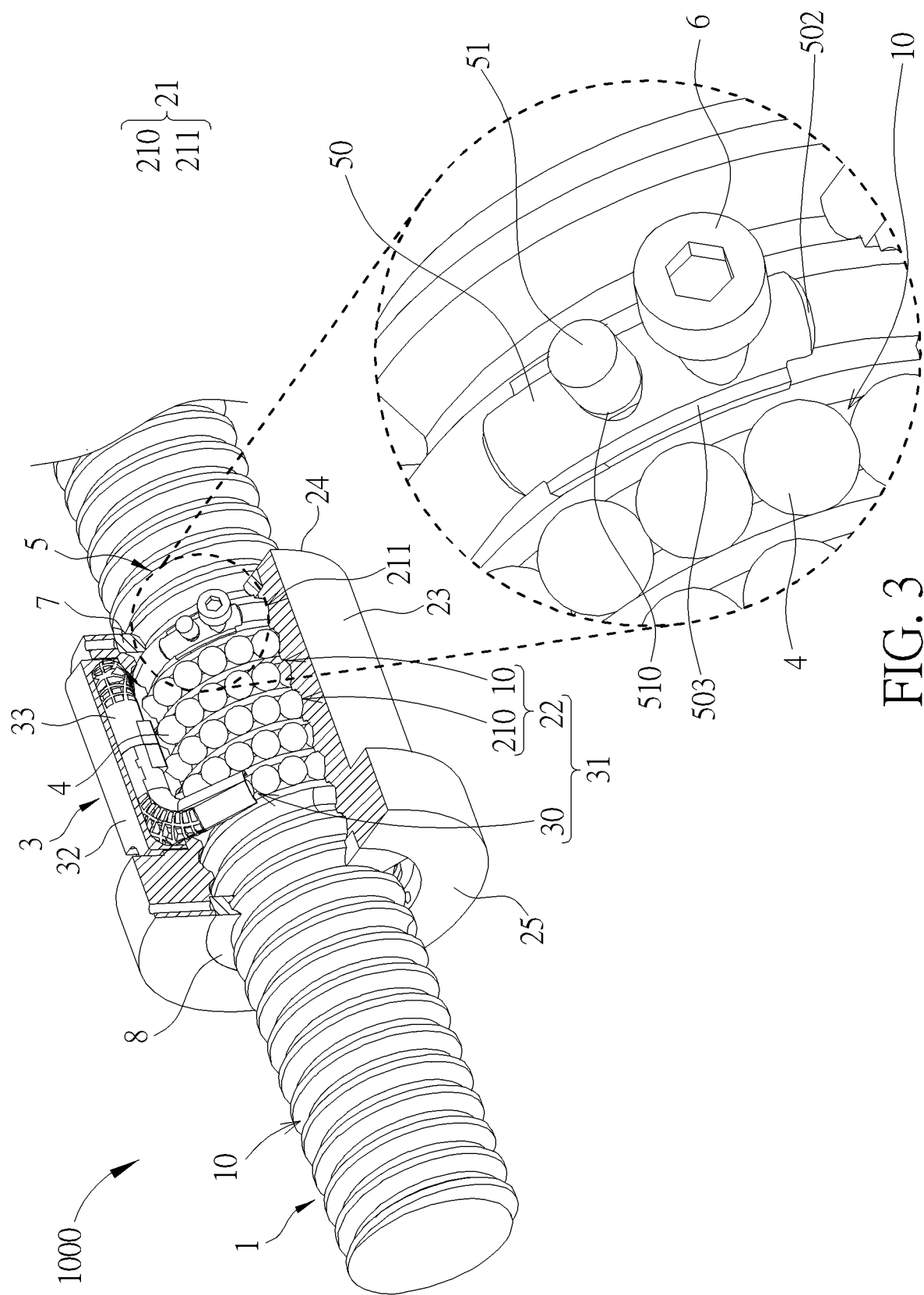
FIG. 3 is a partial cross-sectional view of the transmission mechanism shown in FIG. 1 along line A-A.

Please refer to FIG. 1 to FIG. 3. FIG. 1 is a schematic diagram showing a transmission mechanism 1000 according to a first embodiment of the present disclosure. FIG. 2 is an exploded diagram showing the transmission mechanism 1000 according to the first embodiment of the present disclosure. FIG. 3 is a partial cross-sectional view of the transmission mechanism 1000 shown in FIG. 1 along line A-A. As shown in FIG. 1 to FIG. 3, the transmission mechanism 1000 includes a shaft 1, a moving part 2, a circulating device 3, a plurality of rollers 4 and a monitoring module 5. The shaft 1 has a roller groove 10. The moving part 2 is movably disposed on the shaft 1. The moving part 2 has a roller slot 21 corresponding to the roller groove 10. The roller slot 21 has an effective thread section 210 and an ineffective thread section 211. The effective thread section 210 of the roller slot 21 and the roller groove 10 together form a load path 22. In practice, the shaft 1 can be a screw shaft of a ball screw mechanism, and the moving part 2 can be a nut of the ball screw mechanism. The roller groove 10 can be an external thread of the screw shaft (i.e., the shaft 1), and the roller slot 21 can be an internal thread of the nut (i.e., the moving part 2). The nut (i.e., the moving part 2) is movably disposed on the screw shaft (i.e., the shaft 1) by the thread arrangement of the external thread and the internal thread.

The circulating device 3 is disposed on the moving part 2. The circulating device 3 has a return channel 30 communicated with the load path 22. The return channel 30 and the load path 22 together form a circulating path 31. The plurality of rollers 4 are disposed in the circulating path 31. In practice, each of the plurality of rollers 4 can be a ball. Each of the balls (i.e., the rollers 4) performs a circulating motion through the circulating path 31 formed by the return channel 30 and the load path 22. In the embodiment, the circulating device 3 can include a cover 32 and a tube 33. The moving part 2 has a peripheral wall 23, a first end portion 24 and a second end portion 25. The first end portion 24 is opposite to the second end portion 25. The peripheral wall 23 is connected between the first end portion 24 and the second end portion 25. The cover 32 is disposed on the peripheral wall 23 of the moving part 2, and the tube 33 is mounted in the cover 32 and has the return channel 30. As such, the return channel 30 can be disposed outside the moving part 2, such that the circulating path 31 formed by the return channel 30 and load path 22 is an external circulating path (i.e., the transmission mechanism 1000 is an external recirculation type Ball screw mechanism). Each of the balls (i.e., the rollers) can flow to an external of the moving part 2 via the return channel 30, then return to the load path 22 inside the moving part 2.

Figure 4:
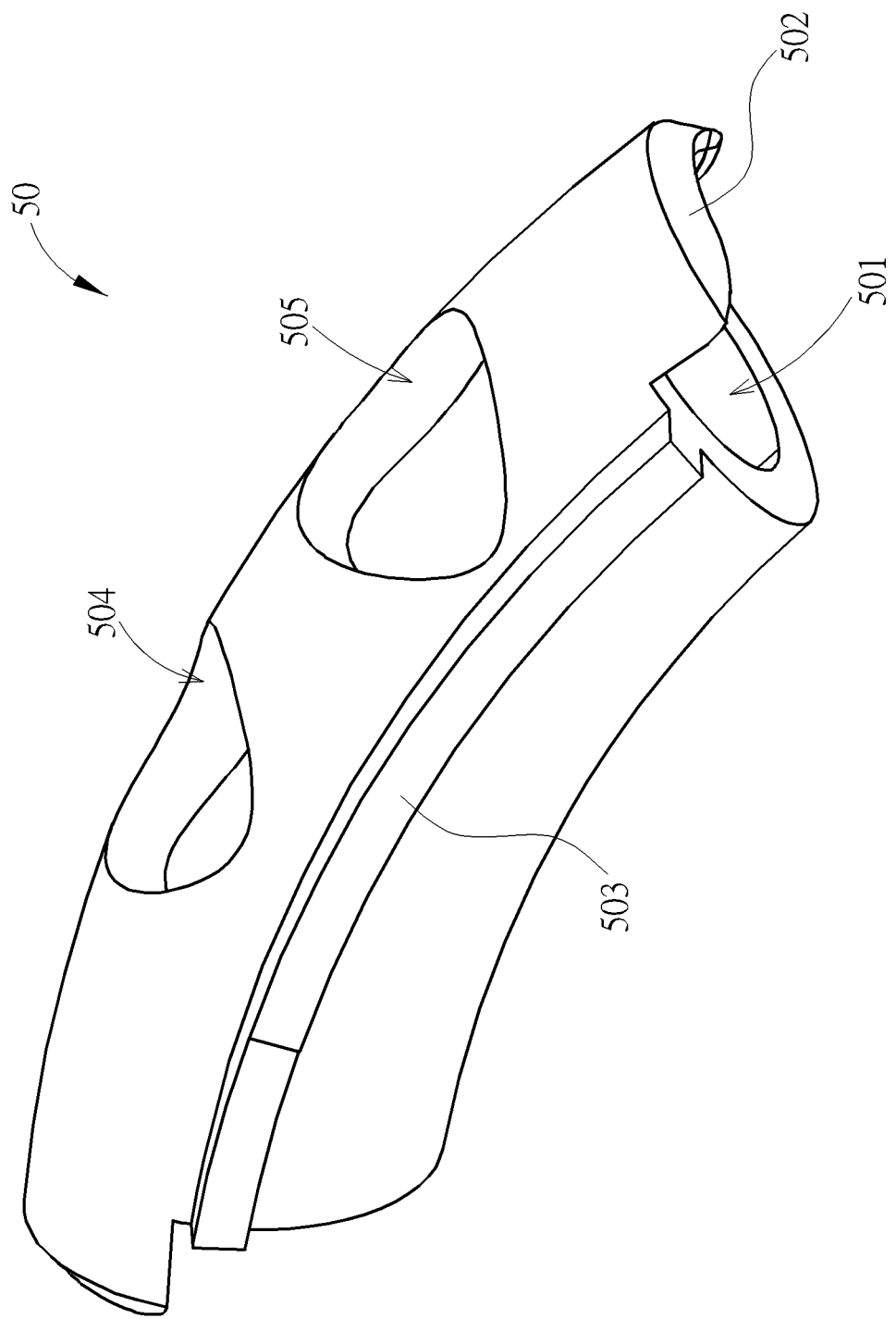
FIG. 4 is a schematic diagram showing a gathering body according to the first embodiment of the present disclosure.

The monitoring module 5 includes a gathering body 50 and a sensor 51. Please refer to FIG. 1 to FIG. 4. FIG. 4 is a schematic diagram showing the gathering body 50 according to the first embodiment of the present disclosure. As shown in FIG. 1 to FIG. 4, the gathering body 50 is disposed in the ineffective thread section 211 of the roller slot 21 of the moving part 2. The gathering body 50 has a gathering channel 501 communicated with the roller groove 10 of the shaft 1. The sensor 51 is disposed on the gathering body 50. In practice, the roller groove 10 of the shaft 1 and the roller slot 21 of the moving part 2 are covered with a lubricant to lubricate contact surfaces of the plurality of rollers 4 and the circulating path 31. The sensor 51 is for detecting a metal (such as iron powder) content of the lubricant in the gathering channel 501 of the gathering body 500. In the embodiment, the sensor 51 can be a proximity sensor, such as a Hall switch based on the magnetic sensing principle. However, the present disclosure is not limited thereto. The sensor 51 can also be a spectrometer or other sensors capable of detecting the metal content of the lubricant.

In the embodiment, a first assembly through hole 230 and a second assembly through hole 231 are formed on the peripheral wall 23 of the moving part 2. A sensing hole 504 and a combining hole 505 are formed on the gathering body 50. The sensing hole 504 is communicated with the gathering channel 501. The sensor 51 is mounted on the gathering body 50 through the first assembly through hole 230. As such, a sensing end 510 of the sensor 51 is disposed in the gathering channel 501 through the sensing hole 504. Therefore, the sensor 51 can detect the metal content of the lubricant in the gathering channel 501 of the gathering body 50 via the sensing end 510.

In the embodiment, the transmission mechanism 1000 can further includes an assembling element 6. The assembling element 6 fixes the gathering body 50 to the moving part 2 through the second assembly through hole 231 of the peripheral wall 23 of the moving part 2 and the combining hole 505 of the gathering body 50. In practice, the assembling element 6 can be a fixing screw, and the second assembly through hole 231 can be a screw hole. The fixing screw (i.e., the assembling element 6) is screwed in the screw hole (i.e., the second assembly through hole 231), and an end of the fixing screw (i.e., the assembling element 6) engages with the combining hole 505 of the gathering body 50 so as to fix the gathering body 50 to the moving part 2. However, the present disclosure is not limited thereto. For example, the assembling element 6 can be a rivet, and the second assembly through hole 231 can correspondingly be a rivet hole.

As shown in FIG. 1 to FIG. 4, the transmission mechanism 1000 can further includes a first scraping element 7 and a second scraping element 8. The first scraping element 7 is disposed at the first end portion 24 of the moving part 2. The second scraping element 8 is disposed at the second end portion 25 of the moving part 2. The first scraping element 7 and the second scraping element 8 are configured to seal two openings at two ends of the moving part 2 to prevent dust or debris from entering the moving part 2. Furthermore, the first scraping element 7 and the second scraping element 8 can also be configured to stop the lubricant from flowing out the moving part 2, so as to ensure the lubrication between the plurality of rollers 4 and the circulating path 31.

In the embodiment, the gathering body 50 of the monitoring module 5 is disposed between the circulating path 31 and the first scraping element 7. With the arrangement, the movement of the plurality of rollers in the circulating path 31 is not interfered. However, the present disclosure is not limited thereto. For example, in another embodiment, the gathering body 50 of the monitoring module 5 can also be disposed between the circulating path 31 and the second scraping element 8. For yet another embodiment, the gathering body 50 of the monitoring module 5 can be disposed between the circulating path 31 and the first scraping element 7 and between the circulating path 31 and the second scraping element 8 simultaneously. That is, the gathering body 50 disposed between the circulating path 31 and the first scraping element 7 and/or the circulating path 31 and the second scraping element 8 are all within the scope of the present disclosure.

In the embodiment, the gathering body 50 has a scooping portion 502. The scooping portion 502 is for guiding the lubricant to enter the gathering channel 501. Because the gathering body 50 is fixed on the moving part 2 and is synchronous with the moving part 2, when the shaft 1 rotates relative to the moving part 2, the groove wall of the roller groove 10 of the shaft 1 is displaced relative to the gathering body 50 and the scooping portion 502. As such, the lubricant is scooped into the gathering channel 501 by the scooping portion 502.

In the embodiment, the scooping portion 502 of the gathering body 50 is disposed in the groove wall of the ineffective thread section 211 of the roller slot 21 of the moving part 2. The scooping portion 502 is an arc structure, and the arc structure (i.e., the scooping portion 502) corresponds to a contour of the ineffective thread section 211 of the roller slot 21 of the moving part 2. But the arrangement of the scooping portion 502 is not limited thereto. In another embodiment, the scooping portion 502 of the gathering body 50 can be disposed in the roller groove 10 of the shaft 1 and can also be an arc structure, and the arc structure (i.e., the scooping portion 502) corresponds to a contour of the groove wall of the roller groove 10 of the shaft 1.

In the embodiment, the gathering body 50 has at least one gathering wing portion 503. The at least one gathering wing portion 503 is extended outside the roller groove 10 for scraping and collecting the lubricant outside the roller groove 10. In the embodiment, the gathering body 50 has two gathering wing portions 503, and the two gathering wing portions 503 are located at two screw peaks of two neighboring roller grooves 10 of the shaft 1, respectively. As such, the gathering body 50 can scoop the lubricant into the gathering channel 501 via the scooping portion 502, and can scrape and collect the lubricant located at the screw peaks of the shaft 1 via the two gathering wing portion 503. Therefore, the lubricant can be gathered into the gathering channel 501 of the gathering body 50 more efficiently. The number of the gathering wing portions 503 is not limited to that shown in the drawing of the embodiment. For example, the gathering body 50 can have only one gathering wing portion 503, which depends on practical needs.

Figure 7:
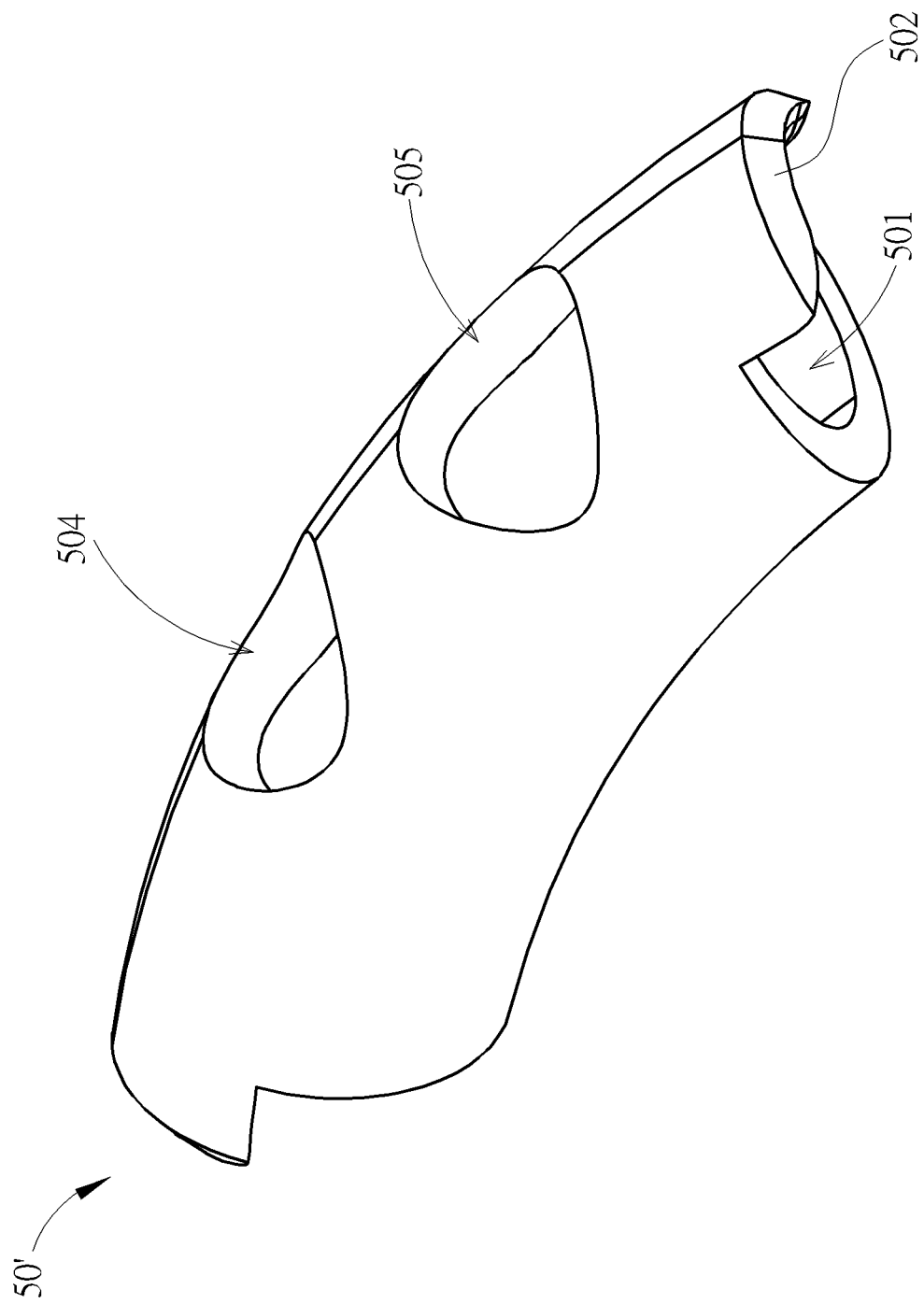
FIG. 7 is a schematic diagram showing a gathering body according to another embodiment of the present disclosure.

Furthermore, the gathering wing portion 503 of the gathering body 50 is selective. For example, please refer to FIG. 7, which is a schematic diagram showing a gathering body 50' according to another embodiment of the present disclosure. The main difference between the gathering body 50' and the aforementioned gathering body 50 is that the gathering body 50' is not arranged with the gathering wing portion for meeting different machine specifications.

Figure 5:
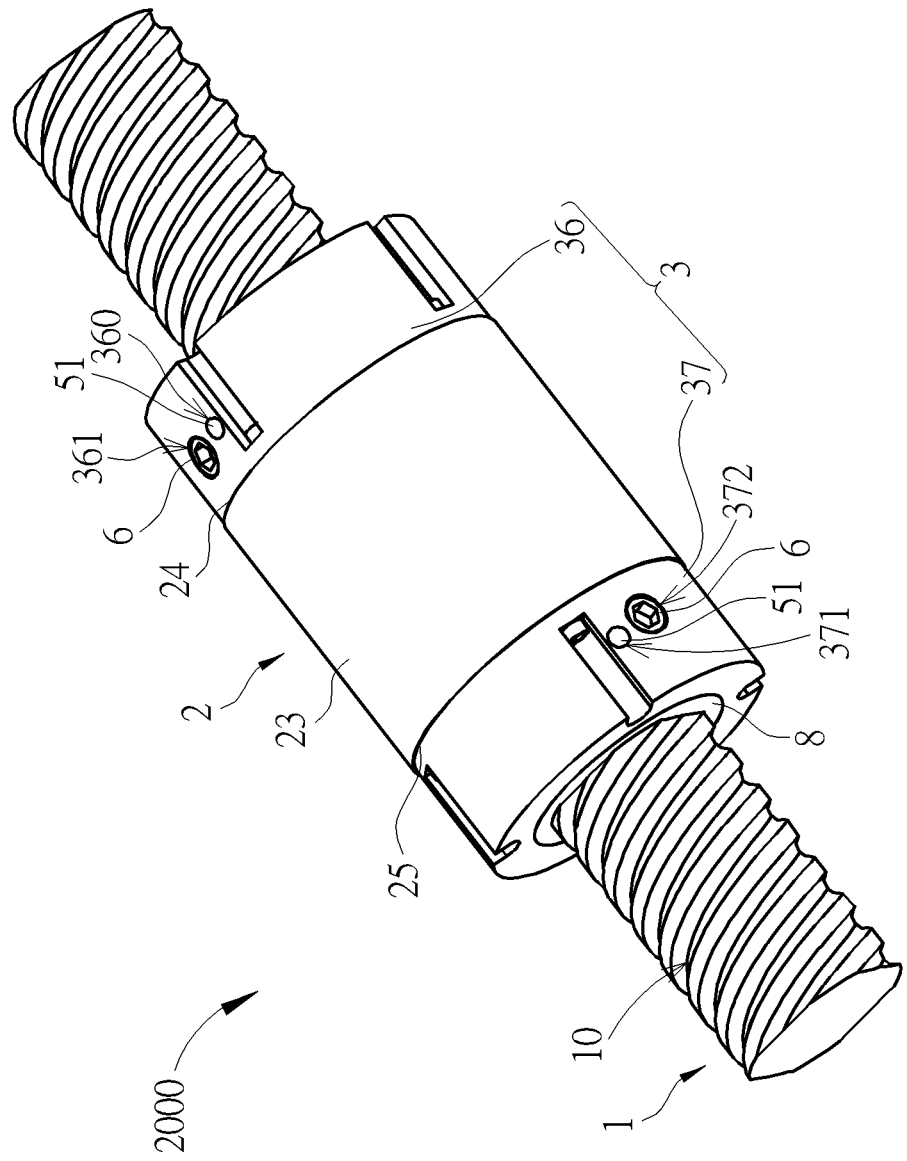
FIG. 5 is a schematic diagram showing a transmission mechanism according to a second embodiment of the present disclosure.
Figure 6:
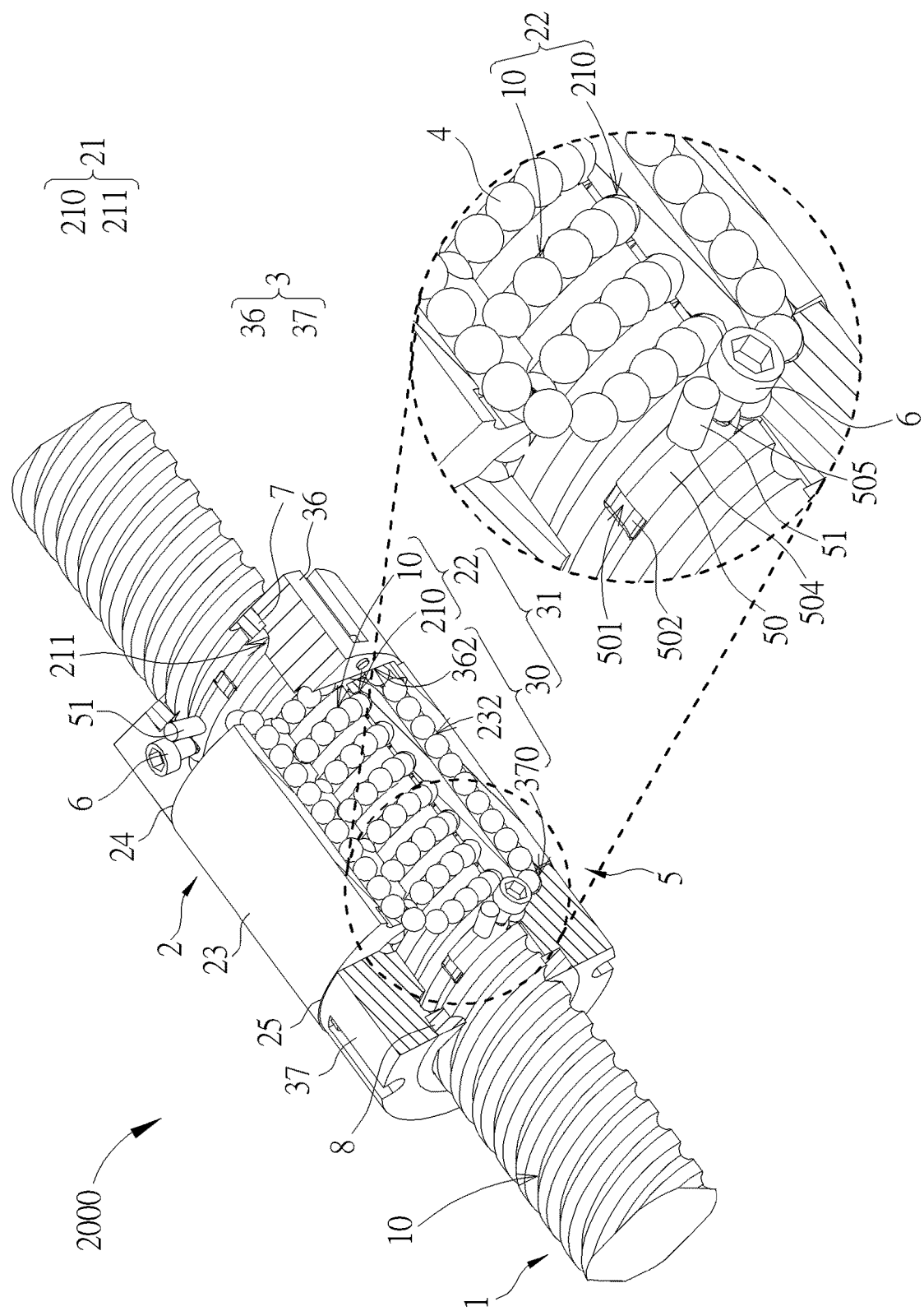
FIG. 6 is a partial cross-sectional view of the transmission mechanism according to the second embodiment of the present disclosure.

Please refer to FIG. 5 and FIG. 6. FIG. 5 is a schematic diagram showing a transmission mechanism 2000 according to a second embodiment of the present disclosure. FIG. 6 is a partial cross-sectional view of the transmission mechanism 2000 according to the second embodiment of the present disclosure. The main difference between the transmission mechanism 2000 and the aforementioned transmission mechanism 1000 is that the transmission mechanism 2000 is an endcap recirculation type ball screw mechanism. Specifically, the transmission mechanism 2000 includes a first end cap 36 and a second end cap 37. The first end cap 36 is disposed on the first end portion 24 of the moving part 2, and the second end cap 37 is disposed on the second end portion 25 of the moving part 2. In the embodiment, the circulating device 3 of the transmission mechanism 2000 includes the first end cap 36 and the second end cap 37. Specifically, an inner channel 232 is formed in the peripheral wall 23 of the moving part 2, and the inner channel 232 is communicated with the first end portion 24 and the second end portion 25. A first end cap channel 362 is formed on the first end cap 36, and the first end cap channel 362 is communicated with the inner channel 232. A second end cap channel 370 is formed on the second end cap 37, and the second end cap channel 370 is communicated with the inner channel 232. The inner channel 232, the first end cap channel 362 and the second end cap channel 370 together form the return channel 30 of the transmission mechanism 2000 (i.e., the endcap recirculation type ball screw mechanism).

In the embodiment, a first assembly through hole 360 and a second assembly through hole 361 are formed on the first end cap 36, and a first assembly through hole 371 and a second assembly through hole 372 are formed on the second end cap 37. As such, the transmission mechanism 2000 can include two monitoring modules 5. When assembling, the two monitoring modules 5 can be screwed to the second assembly through hole 361 of the first end cap 36 and the second assembly through hole 372 of the second end cap 37 via two assembling elements 6, respectively. Furthermore, the number and the position of the monitoring modules 5 of the transmission mechanism 2000 are not limited to that shown in the drawing of the embodiment. For example, the transmission mechanism 2000 can have only one monitoring module 5, a first assembly through hole 360 and a second assembly through hole 361 are formed on the first end cap 36, or a first assembly through hole 371 and a second assembly through hole 372 are formed on the second end cap 37. When assembling, the monitoring module 5 can be screwed to the second assembly through hole 361 of the first end cap 36 or the second assembly through hole 372 of the second end cap 37 via the assembling element 60. That is, the first assembly through hole 360 and second assembly through hole 361 formed on the first end cap 36 and/or the first assembly through hole 371 and the second assembly through hole 372 formed on the second end cap 37, and the monitoring module 5 fixed to the first end cap 36 and/or the second end cap 37 via the assembling element 6 are all within the scope of the present disclosure.

In the embodiment, the first scraping element 7 is disposed on the first end cap 36, and the second scraping element 8 is disposed on the second end cap 37. The gathering body 50 of one of the monitoring modules 50 is disposed between the circulating path 31 and the first scraping element 7, and the gathering body 50 of the other one of the monitoring modules 50 is disposed between the circulating path 31 and the second scraping element 8.

Figure 8:
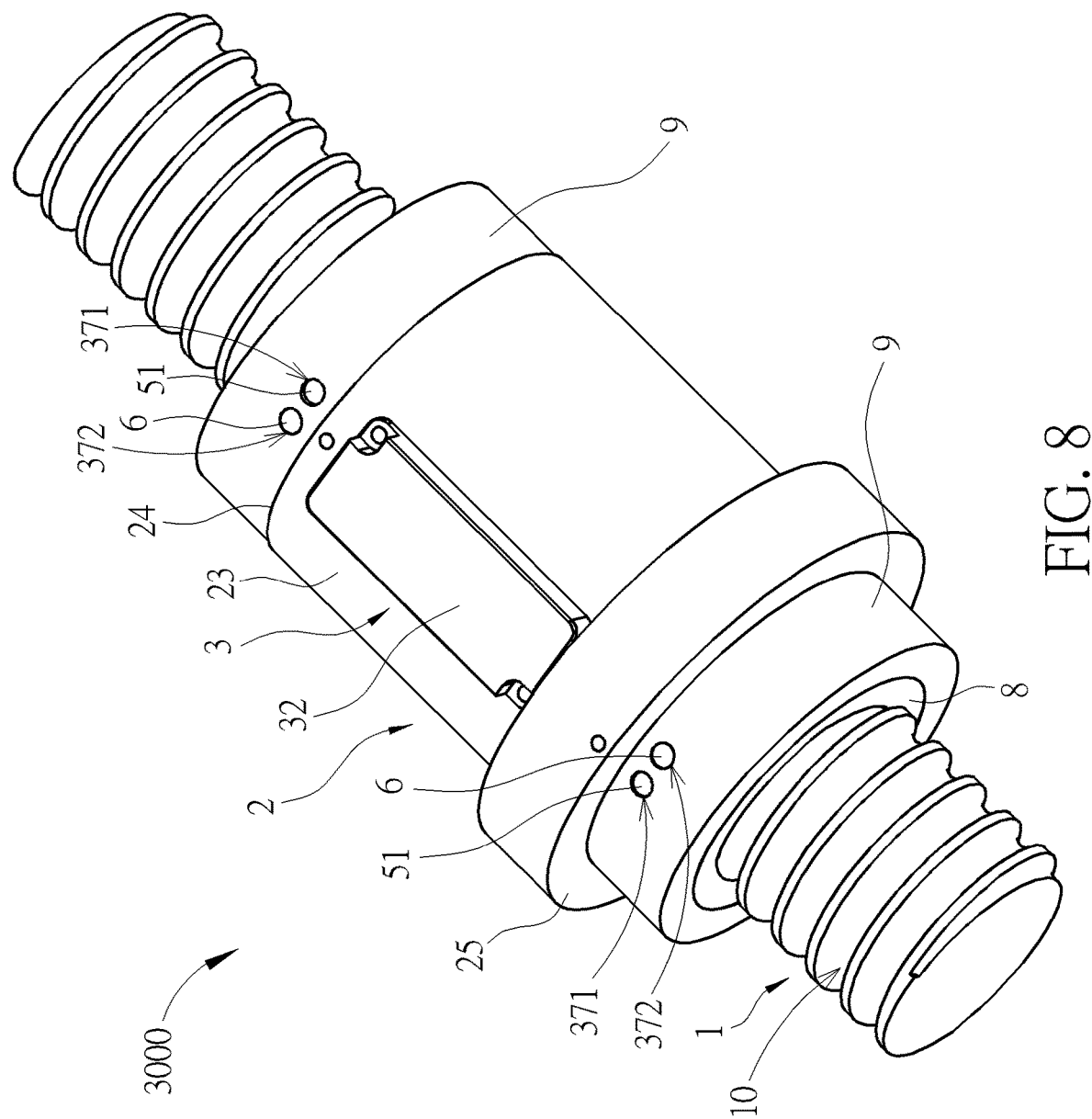
FIG. 8 is a schematic diagram showing a transmission mechanism according to a third embodiment of the present disclosure.
Figure 9:
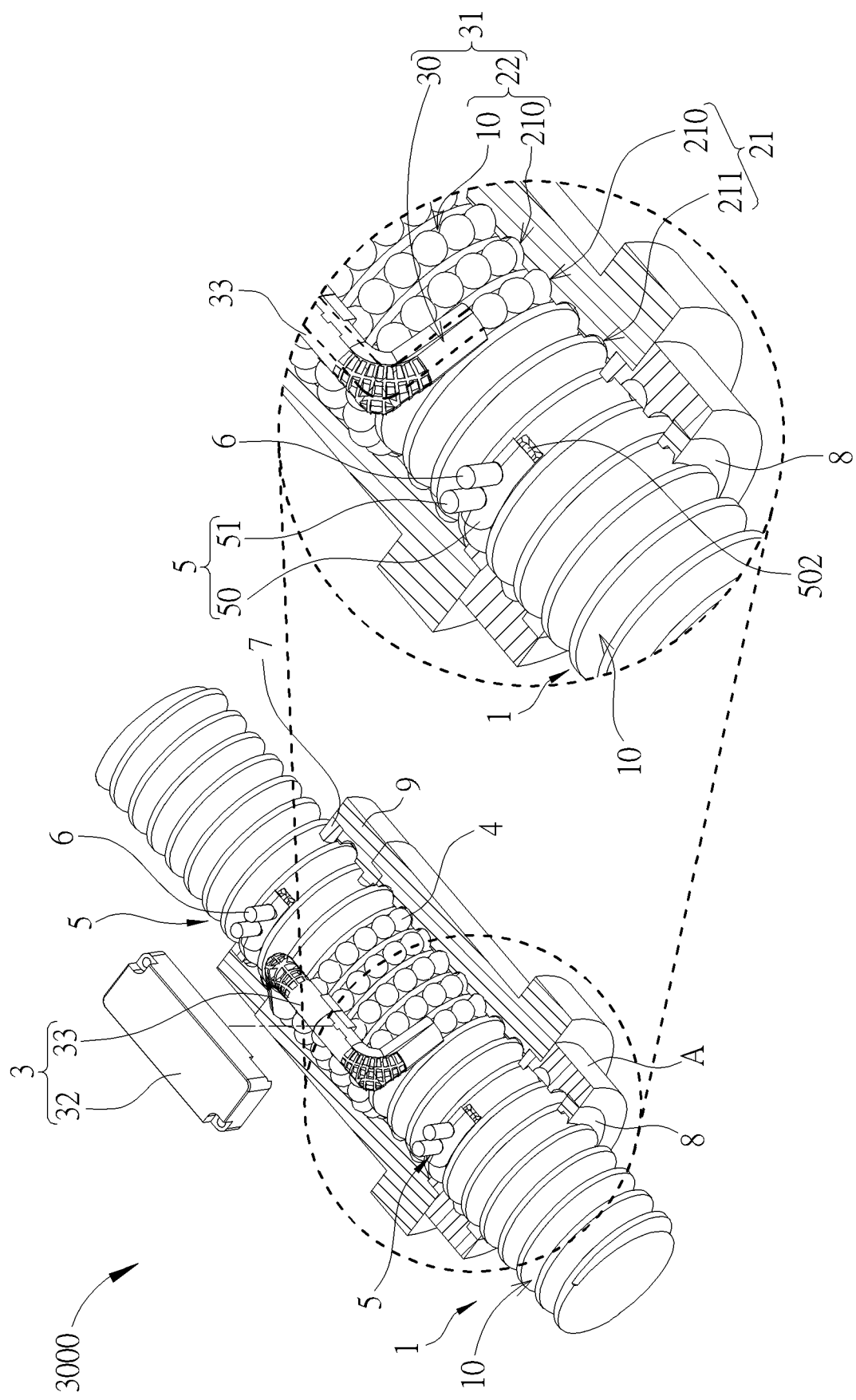
FIG. 9 is a partial cross-sectional view of the transmission mechanism according to the third embodiment of the present disclosure.

Please refer to FIG. 8 and FIG. 9. FIG. 8 is a schematic diagram showing a transmission mechanism 3000 according to a third embodiment of the present disclosure. FIG. 9 is a partial cross-sectional view of the transmission mechanism 3000 according to the third embodiment of the present disclosure. In the embodiment, the transmission mechanism 3000 includes two monitoring modules 5. The main difference between the transmission mechanism 3000 and the aforementioned transmission mechanism 1000 is that each of the monitoring modules 5 further includes a shell 9, and the gathering body 50 is disposed in the shell 9. Furthermore, the shells 9 are disposed on the first end portion 24 and the second end portion 25 of the moving part 2, respectively. In other words, each of the monitoring modules 5 is independent from the moving part 2. One of the monitoring modules 5 is detachably mounted on the first end portion 24 of the moving part 2, and the other one of the monitoring modules 5 is detachably mounted on the second end portion 25 of the moving part 2. However, the number and the position of the monitoring modules 5 of the transmission mechanism 3000 are not limited to that shown in the drawing of the embodiment. For example, the transmission mechanism 3000 can include only one monitoring module 5, and the monitoring module 5 can be selectively disposed on the first end portion 24 or the second end portion 25 of the moving part 2.

In the embodiment, the first scraping element 7 is disposed on one of the two shells 9, and the second scraping element 8 is disposed on the other one of the two shells 9. The gathering body 50 of one of the two monitoring modules 5 is disposed between the circulating path 31 and the first scraping element 7, and the gathering body 50 of the other one of the two monitoring modules 5 is disposed between the circulating path 31 and the second scraping element 8.

Furthermore, the transmission mechanism 3000 is an external recirculation type ball screw mechanism. That is, the circulating device 3 of the transmission mechanism 3000 includes the cover 32 and the tube 33. The cover 32 is mounted on the peripheral wall 23 of the moving part 2. The tube 33 is mounted in the cover 32 and has the return channel 30.

Figure 10:
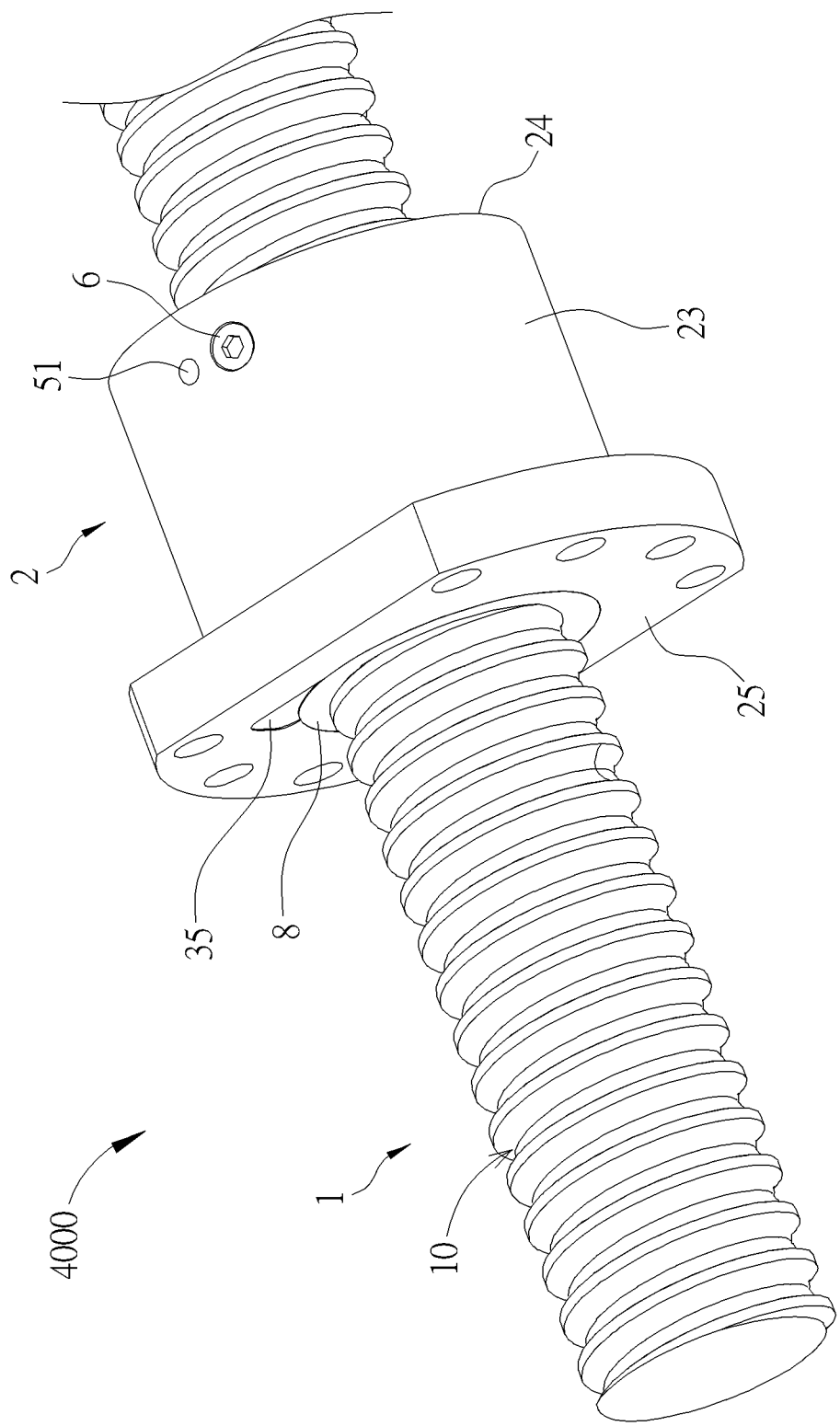
FIG. 10 is a schematic diagram showing a transmission mechanism according to a fourth embodiment of the present disclosure.
Figure 11:
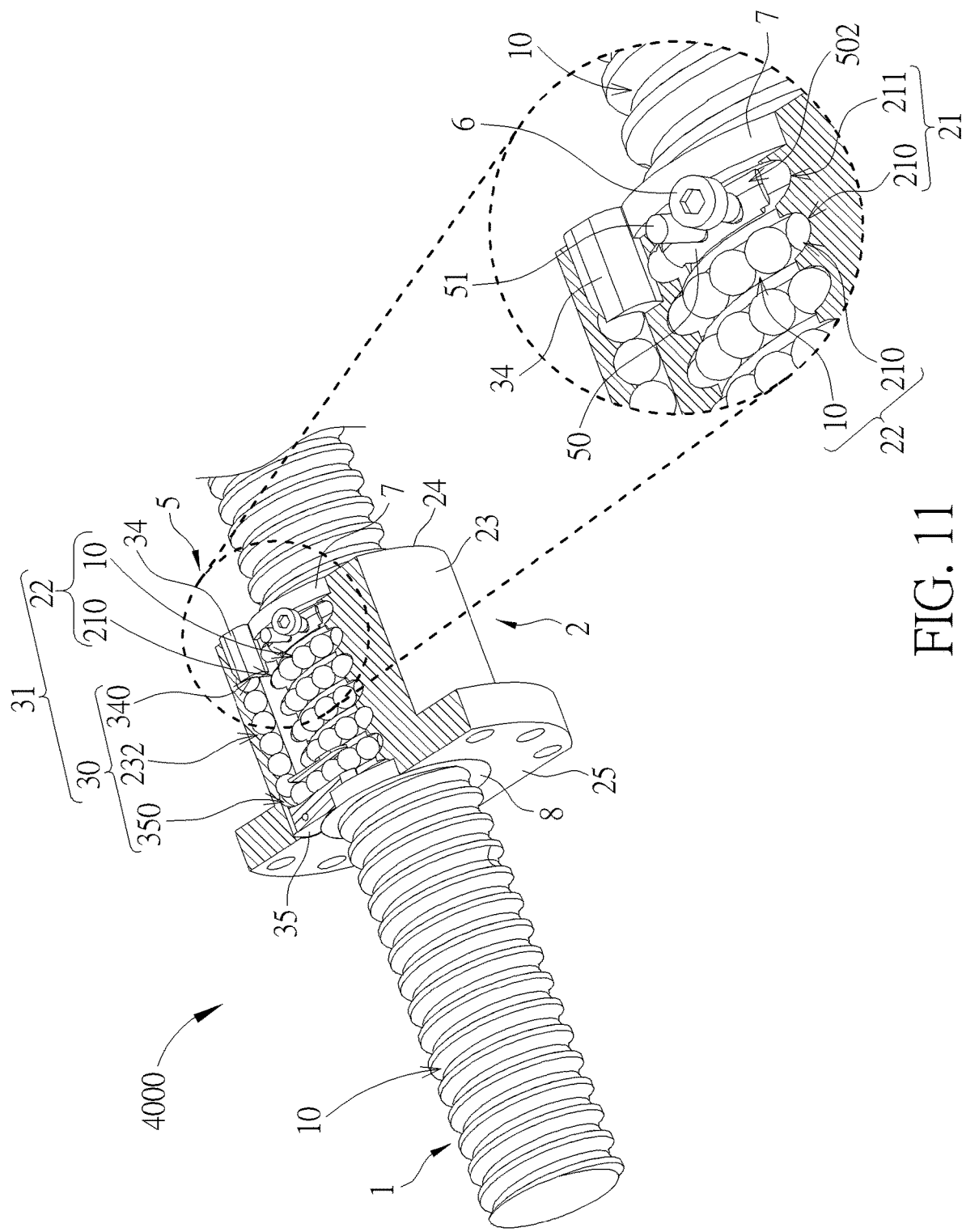
FIG. 11 is a partial cross-sectional view of the transmission mechanism according to the fourth embodiment of the present disclosure.

Please refer to FIG. 10 and FIG. 11. FIG. 10 is a schematic diagram showing a transmission mechanism 4000 according to a fourth embodiment of the present disclosure. FIG. 11 is a partial cross-sectional view of the transmission mechanism 4000 according to the fourth embodiment of the present disclosure. The main difference between the transmission mechanism 4000 and the aforementioned transmission mechanism 1000 is that the transmission mechanism 4000 is an internal recirculation type ball screw mechanism. Specifically, the circulating device 3 of the transmission mechanism 4000 includes a first circulating element 34 and a second circulating element 35. The inner channel 232 is formed on the peripheral wall 23 of the moving part 2 of the transmission mechanism 4000, and the inner channel 232 is communicated with the first end portion 24 and the second end portion 25. The first circulating element 34 is disposed on the first end portion 24 of the moving part 2. The second circulating element 35 is disposed on the second end portion 25 of the moving part 2. A first circulating passage 340 is formed in the first circulating element 34, and the first circulating passage 340 is communicated with the inner channel 232. A second circulating passage 350 is formed in the second circulating element 35, and the second circulating passage 350 is communicated with the inner channel 232. The inner channel 232, the first circulating passage 340 and the second circulating passage 350 together form the return channel 30.

In the embodiment, the first scraping element 7 is disposed on the first end portion 24 of the moving part 2, and the second scraping element 8 is disposed on the second end portion 25 of the moving part 2. The gathering body 50 of the monitoring module 5 of the transmission mechanism 4000 is disposed between the circulating path 31 and the first scraping element 7. However, the present disclosure is not limited thereto. For example, in another embodiment, the gathering body 50 of the monitoring module 5 can be disposed between the circulating path 31 and a second scraping element 8. In yet another embodiment, the gathering body 50 of the monitoring module 5 can be disposed both between the circulating path 31 and the first scraping element 7 and between the circulating path 31 and the second scraping element 8 simultaneously.

To sum up, the monitoring module 5 according to present disclosure can include the gathering body 50 and/or the gathering body 50' and the sensor 51, wherein the gathering body 50 and/or the gathering body 50' are disposed outside the load path 22 (or the circulating path 31) and communicated with the roller groove 10 of the shaft 1. The monitoring module 5 according to present disclosure can be adapted for internal recirculation type ball screw mechanisms (such as the transmission mechanism 1000, 3000), endcap recirculation type ball screw mechanisms (such as the transmission mechanism 2000) and internal recirculation type ball screw mechanisms (such as the transmission mechanism 4000).

Figure 12:
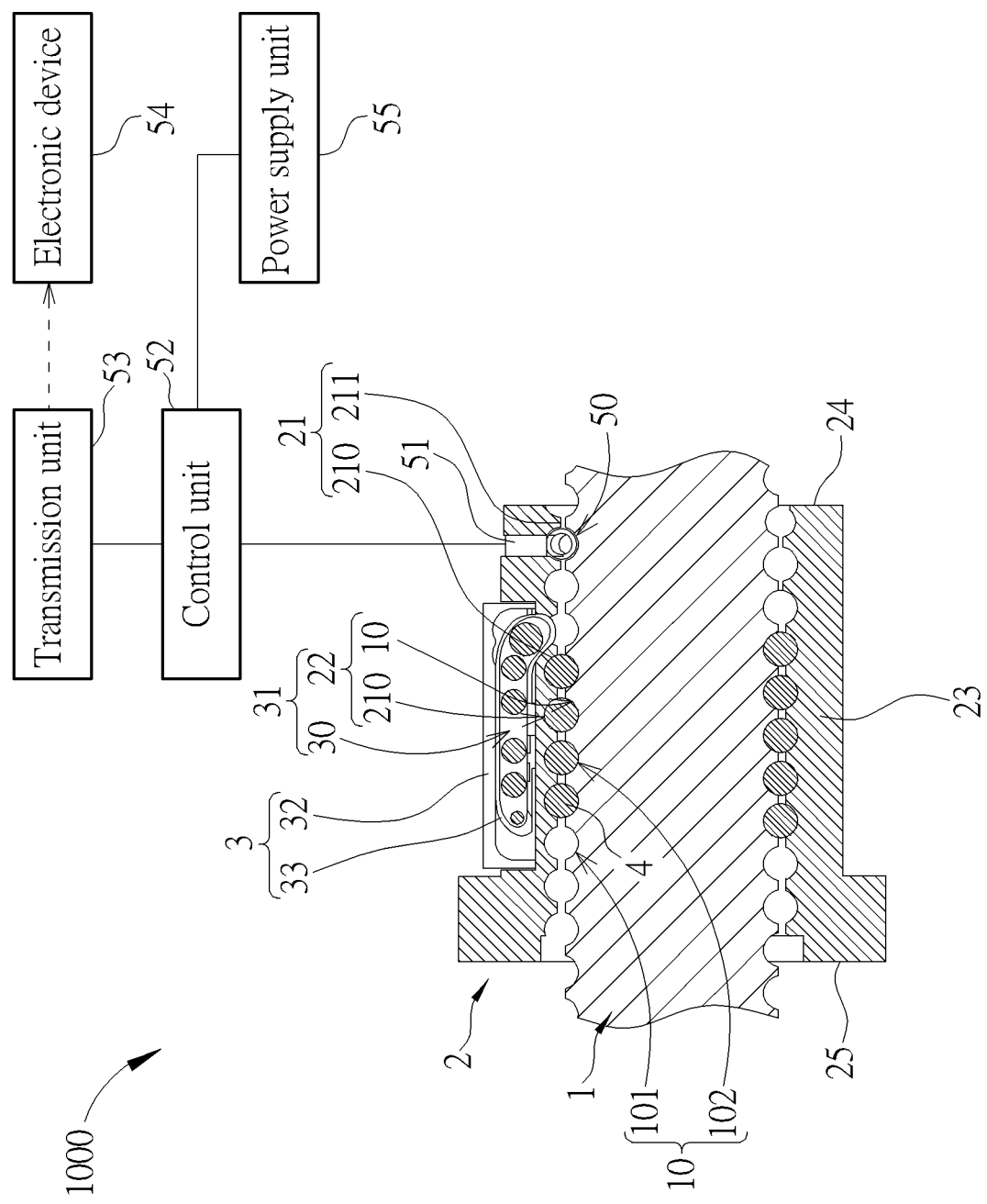
FIG. 12 is a cross-sectional view of the transmission mechanism shown in FIG. 1 along line B-B.

Please refer to FIG. 12. FIG. 12 is a cross-sectional view of the transmission mechanism 1000 shown in FIG. 1 along line B-B. The monitoring module 5 of the transmission mechanism 1000 further includes a control unit 52 and a power supply unit 55. The control unit 52 is coupled to the sensor 51 and the power supply unit 55. The power supply unit 55 is configured to provide power to the control unit 52, such that the control unit 52 can perform functions of calculation, storage, and so on. The control unit 52 is configured to perform the following steps:

Step 100: control the sensor 51 to detect the metal content of the lubricant in the gathering channel 501 of the gathering body 50 at each predetermined time interval.

Step 200: determine if the metal content of the lubricant in the gathering channel 501 of the gathering body 50 exceeds a threshold value; if yes, go to Step 300; in not, return to Step 110.

Step 300: send a warning or execute a treatment means.

When the monitoring module 5 of the present disclosure is applied to perform a monitoring function, the control unit 52 can control the sensor 51 to detect the metal content of the lubricant in the gathering channel 501 of the gathering body 50 at each predetermined time interval (Step 100), wherein the predetermined time interval can be but is not limited to 1 minutes. Meanwhile, the control unit 52 determines if the metal content of the lubricant in the gathering channel 501 of the gathering body 50 exceeds a threshold value, wherein the threshold value can be but is not limited to a weight percentage of 0.05% (i.e., 0.05 wt %). For example, the threshold value in the range of the weight percentage of 0.05% to 0.1% (i.e., 0.05 wt % to 0.1 wt %) is all within the scope of the present disclosure. When the control unit 52 determines that the metal content of the lubricant in the gathering channel 501 of the gathering body 50 does not exceed the threshold value, the control unit 52 controls the sensor 51 to continuously detect the metal content of the lubricant in the gathering channel 501 of the gathering body 50 at each predetermined time interval (Step 200); when the control unit 52 determines that the metal content of the lubricant in the gathering channel 501 of the gathering body 50 exceeds the threshold value, the control unit 52 send a warning or execute a treatment means (Step 300). The warning can be but is not limited to send an alarm sound, and the treatment means can be but is not limited to shutdown of the machine.

In another embodiment, the monitoring module 5 can further include a transmission unit 53. The transmission unit 53 is coupled to the control unit 52 and is configured to send an alarm signal to an electronic device 54, wherein the alarm signal can be but is not limited to a prompt message, a warning message, and so on. When the control unit 52 determines that the metal content of the lubricant in the gathering channel 501 of the gathering body 50 exceeds the threshold value, the control unit 52 can further control the transmission unit 53 to send the alarm signal to the electronic device 54, wherein the electronic device 54 can be but is not limited to a mobile phone, a computer, a server, and so on. As such, the monitoring module 5 can send the alarm signal to the person holding the electronic device 54 when the metal content of the lubricant in the gathering channel 501 is abnormal via the transmission unit 53.

Figure 13:
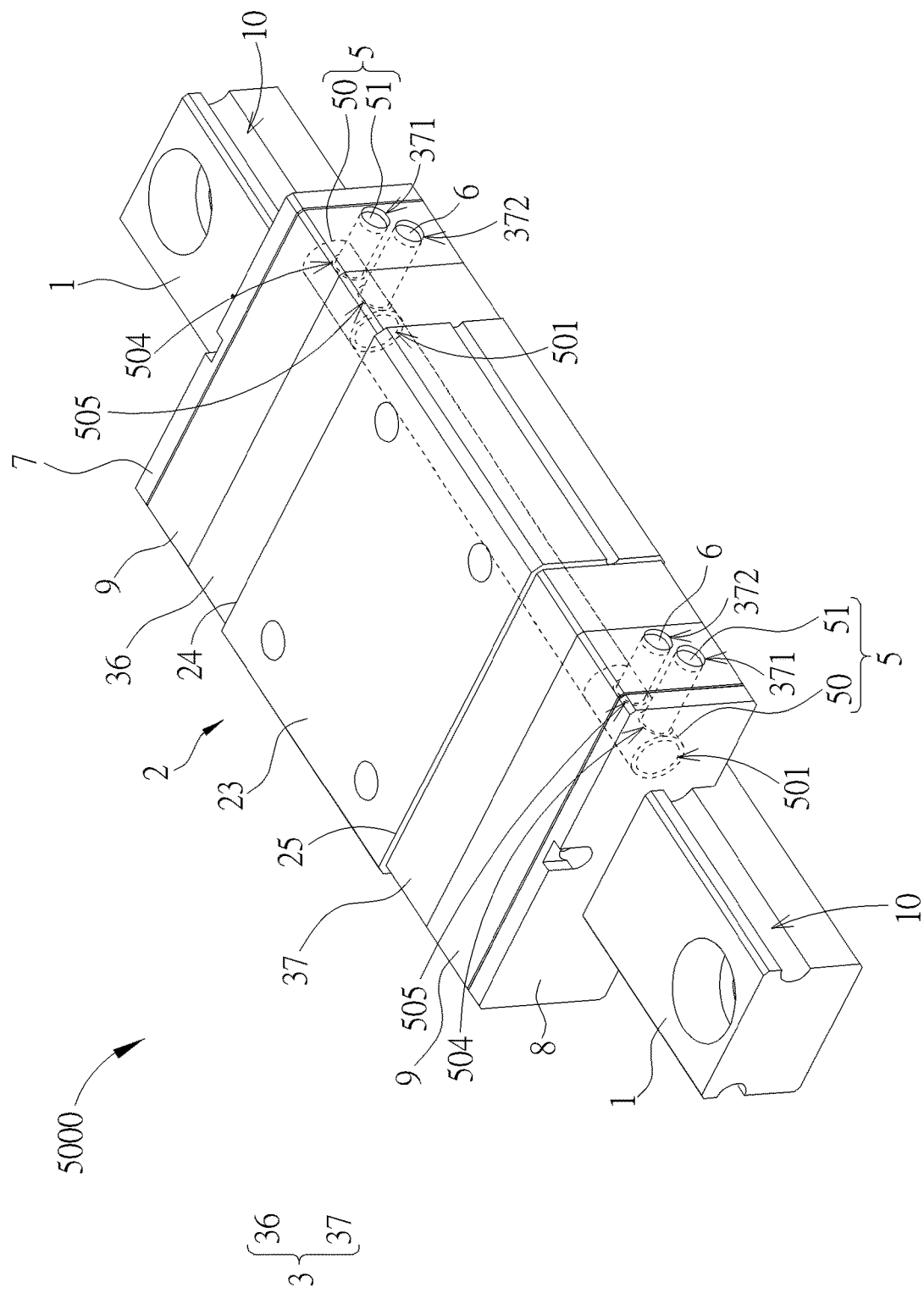
FIG. 13 is a schematic diagram showing a transmission mechanism according to a fifth embodiment of the present disclosure.

Please refer to FIG. 13. FIG. 13 is a schematic diagram showing a transmission mechanism 5000 according to a fifth embodiment of the present disclosure. In the embodiment, the transmission mechanism 5000 is a linear guideway mechanism, the moving part 2 is a sliding block, and the shaft 1 is a sliding rail. The first end cap 36 and second end cap 37 are disposed on the first end portion 24 and the second end portion 25 of the sliding block (i.e., the moving part 2). In the embodiment, the transmission mechanism 5000 can include two shells 9 and two monitoring modules 5. The shells 9 are detachably mounted on a side of the first end cap 36 opposite to the first end portion 24 and a side of the second end cap 37 opposite to the second end portion 25, respectively. The two monitoring modules 5 are mounted on the two shells 9, respectively. Furthermore, the first scraping element 7 is mounted on a side of the shell 9 opposite to the first end cap 36, and the second scraping element 8 is mounted to a side of the shell 9 opposite to the second end cap 37. The structure and the function of the monitoring modules 5 can be the same as that of the aforementioned embodiment, and are not repeated herein.

Comparing to prior art, the gathering body of the monitoring module of the present disclosure is disposed outside the circulating path of the transmission mechanism and is communicated with the roller groove of the shaft. When the transmission mechanism is running, the sensor of the monitoring module can initiatively and directly detect the metal content of the lubricant in the gathering channel of the gathering body. Furthermore, because the gathering channel of the gathering body is a through hole, the lubricant will circulate continuously, which can prevent the pollution caused by the accumulation of metal. Accordingly, the sensing accuracy can be enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmission mechanism with monitoring function, comprising:
   a shaft having a roller groove;
   a moving part movably disposed on the shaft, the moving part having a roller slot corresponding to the roller groove, the roller slot having an effective thread section and an ineffective thread section, the effective thread section of the roller slot and the roller groove together forming a load path;
   a circulating device disposed on the moving part, the circulating device having a return channel communicated with the load path, the return channel and the load path together forming a circulating path;
   a plurality of rollers disposed in the circulating path; and
   a monitoring module, comprising:
      a gathering body disposed in the ineffective thread section of the roller slot, the gathering body having a gathering channel communicated with the roller groove; and a sensor disposed on the gathering body, a sensing end of the sensor being disposed in the gathering channel;

wherein the roller groove and the roller slot are covered with a lubricant to lubricate the plurality of rollers;

wherein the sensor is for detecting a metal content of the lubricant in the gathering channel.

2. The transmission mechanism of claim 1, wherein the gathering body has a scooping portion for guiding the lubricant to enter the gathering channel.

3. The transmission mechanism of claim 1, wherein the gathering body has at least one gathering wing portion, the at least one gathering wing portion is extended outside the roller groove for scraping and collecting the lubricant outside the roller groove.

4. The transmission mechanism of claim 1, wherein the monitoring module further comprises:
   a control unit coupled to the sensor, wherein the control unit is configured to:
      send a warning or execute a treatment means when the sensor detects that the metal content of the lubricant in the gathering channel exceeds a threshold value.

5. A transmission mechanism, comprising:
   a shaft having a roller groove;
   a moving part movably disposed on the shaft, the moving part having a roller slot corresponding to the roller groove, the roller slot having an effective thread section and an ineffective thread section, the effective thread section of the roller slot and the roller groove together forming a load path, the moving part having a peripheral wall, a first end portion and a second end portion opposite to the first end portion, the peripheral wall being connected between the first end portion and the second end portion;
   a circulating device disposed on the moving part, the circulating device having a return channel communicated with the load path, the return channel and the load path together forming a circulating path;
   a plurality of rollers disposed in the circulating path; and
   a monitoring module, comprising:
      a shell disposed on the first end portion or the second end portion;
      a gathering body disposed in the shell, the gathering body having a gathering channel communicated with the roller groove; and
      a sensor disposed on the gathering body, a sensing end of the sensor being disposed in the gathering channel;
   wherein the roller groove and the roller slot are covered with a lubricant to lubricate the plurality of rollers;
   wherein the sensor is for detecting a metal content of the lubricant in the gathering channel.

* * * * *